Figure 1:
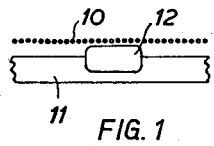

July 18, 1961     E. R. LAITHWAITE     2,993,130
INDUCTION MOTORS FOR SHUTTLE PROPULSION IN WEAVING LOOMS
Filed July 8, 1957     2 Sheets-Sheet 1

INVENTOR
ERIC ROBERTS LAITHWAITE
BY
Stevens, Davis, Miller and Mosher
ATTORNEYS

July 18, 1961 E. R. LAITHWAITE 2,993,130
INDUCTION MOTORS FOR SHUTTLE PROPULSION IN WEAVING LOOMS
Filed July 8, 1957 2 Sheets-Sheet 2

INVENTOR
ERIC ROBERTS LAITHWAITE
BY
Stevens, Davis, Miller & Mosher
ATTORNEYS

United States Patent Office 2,993,130
Patented July 18, 1961

2,993,130
INDUCTION MOTORS FOR SHUTTLE PROPULSION IN WEAVING LOOMS

Eric Roberts Laithwaite, Manchester, England, assignor to National Research Development Corporation, London, England, a British corporation
Filed July 8, 1957, Ser. No. 670,577
Claims priority, application Great Britain July 11, 1956
1 Claim. (Cl. 310—13)

The present invention relates to induction motors and is more particularly concerned with linear induction motors such as are employed, for instance, for effecting shuttle propulsion in weaving looms. The invention is also concerned with a weaving loom in which shuttle propulsion is effected by the use of a linear induction motor.

Linear induction motors are already known and in one prior proposal, reciprocation of the rotor or moving member is effected by causing the moving member to be acted upon by a reversing stator field, reversal being caused by suitable permanent connection of the stator windings in such a manner that the magnetic field generated by the stator moves inwardly from the two ends of the stator. Further it has been shown that the amplitude of the movement of the moving member will be stable if $$\frac{R}{X}$$

is less than unity where R is the equivalent resistance and X is the equivalent reactance of each phase of the moving member.

In the application of the known linear motor to shuttle propulsion in weaving looms, the moving member is in the form of a carriage provided with the equivalent of rotor bars and is fitted with ball races as wheels, the carriage moving on rails provided on the stator track. The stator is energized by polyphase current and in a construction of this type, the magnetic attraction between the moving member and the stator is considerable and may result in damage to the warp threads even though the warp threads are being continually absorbed into the finished cloth so that the moving member does not repeatedly engage with the same piece of warp.

One of the objects of the present invention is to provide an improved construction whereby the magnetic attraction between the moving member and the stator is reduced and the moving member has a movement which more nearly approximates to that of a "flying shuttle" as this term is used in modern weaving technique.

Further objects of the invention are the provision of improved methods of stabilizing the moving member and the provision of improved methods of driving a loom, more particularly a loom which does not use a reed.

According therefore to one feature of the invention, a double-sided system is used in which a stator track is provided above and below the moving member. This tends to balance out the downward magnetic attraction between the moving member and stator and if the path of movement of the moving member is arranged to be somewhat nearer the upper track than the lower track, a part of the weight of the moving member may also be balanced out.

According to a further development of this aspect of the invention, the moving member consists only of non-ferrous conducting material moving between a double stator track. In an arrangement of the two stator tracks such that opposite poles on the tracks are of the same polarity, the moving member will tend to occupy a mid-position between the two tracks and would, for the greater part of its travel, move freely through the air, thereby approaching the ideal "flying shuttle" owing to leakage flux. This system, however, inevitably results in a machine with poor electrical properties. If the machine is designed to have opposite poles of opposite polarity, the characteristics of the machine will be improved but the shuttle will not float.

One of the requirements of the arrangement using a nonferrous moving member is that the moving member should be thin since otherwise the stator currents would have to be high to drive the flux across the very large air gap, the size and weight of the stator assembly being then large. The shuttle bobbin would in this case be carried by a portion of the moving member projecting from the stator tracks. A difficulty in connection with the use of a non-ferrous moving member is that below a certain speed the $$\frac{R}{X}$$

ratio is unsuitable for self-oscillation at power frequencies and lower frequencies would have to be employed.

Figure 5:
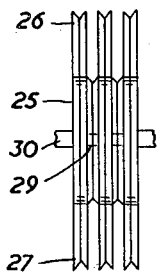
Figure 2:
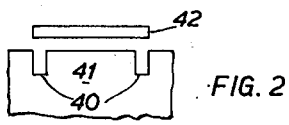
Figure 3:
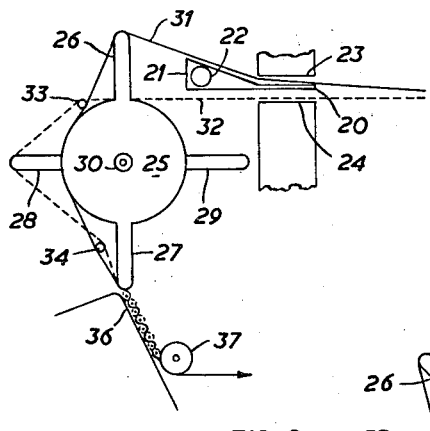
Figure 4:
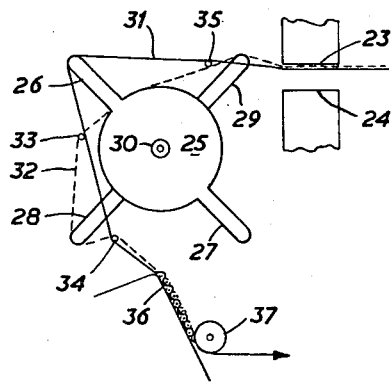
Figure 6:
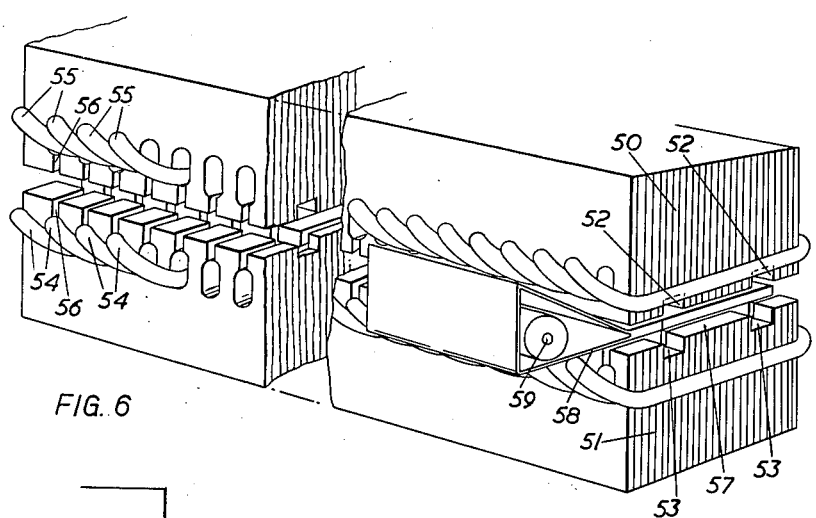
Figure 7:
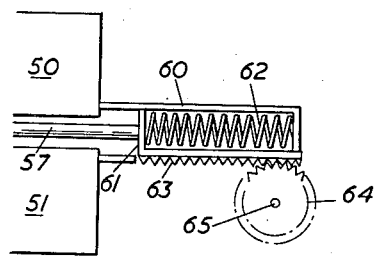
Figure 8:
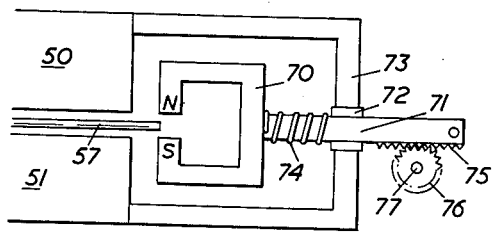

The invention will be better understood from the following description taken in conjunction with the accompanying drawings comprising FIGS. 1 to 8. In the drawings:

FIGS. 1 and 2 show alternative arrangements for the horizontal stabilization of the shuttle, FIGS. 3 and 4 show diagrammatically side elevations of a loom operating without a reed in which shuttle propulsion is effected in accordance with the present invention, FIG. 5 shows a plan view of the shedding and bearing arrangement used in the loom illustrated in FIGS. 3 and 4, FIG. 6 shows in more detail the arrangement of the stator tracks and the shuttle and FIGS. 7 and 8 show two alternative methods of driving the loom shown in FIGS. 3 and 4 making use of the energy of the shuttle.

Referring first to FIG. 6, the two stator members are shown at 50 and 51. These stator members are made from sheet iron laminations which extend in the direction of movement of the shuttle. Slots 52 and 53 extend the whole length of each stator member for the purpose of horizontal stabilization as will be described subsequently. The coils for energizing the stator members are shown at 54 and 55 and are wound in slots 56 in a conventional manner. The coils are energized from a three-phase A.C. supply. The moving member consists of a slab 57 of non-ferrous material to which is attached a non-magnetic housing 58 for holding the weft package shown diagrammatically at 59. The housing is provided with an eyelet through which the thread passes from the weft package in the usual way.

A very valuable property of non-ferrous moving member is apparent when the question of horizontal transverse stabilization of the moving member is considered. The standard practise for obtaining horizontal transverse stabilization of a shuttle consists in firing the shuttle against a curved reed and holding it against the reed throughout its travel due firstly to centrifugal force and secondly to the forward movement of the sley which takes place before the shuttle has completed its travel.

Using a non-ferrous moving member, however, horizontal transverse stabilization is possible with a straight reed because the moving member can be offset from the stator as shown in FIG. 1, and would at all times experience a component of force at right angles to the reed. In FIG. 1, the reed is shown at 10, the stator track at 11 and the shuttle at 12 the direction of the stabilizing force also being indicated.

Recent developments in weaving techniques have resulted in the provision of a loom in which the reed is unnecessary. A moving member or shuttle comprising a thin slab of non-ferrous material may be employed in a loom of this type by horizontally stabilizing the moving member by the provision of two separations between the stator windings. This is preferably effected as shown in FIG. 2 by the provision of two slots 40 in the stator 41, the outer walls of the slots being in alignment with the outer edges of the non-ferrous moving member 42. The flux density is smaller in the gap formed by the slots than in the main air gap and consequently any sideways movement by the moving member causes the latter to come under the influence of a stronger field. This implies a condition of greater total energy and a restoring force returning the moving member to the central position. The projection (not shown) carrying the bobbin or weft package would be made of non-magnetic material.

In the recently developed looms mentioned previously, the number of moving parts is considerably reduced and since the moving member or shuttle moves at high speed it is possible to use the energy of the shuttle to drive the loom mechanism. In carrying this aspect of the invention into effect, the shuttle propelling mechanism is designed to give a stable amplitude of oscillation somewhat greater than that normally required for the desired width of cloth so that the shuttle has sufficient energy when it reaches the shuttle box to operate the drive mechanism. The drive mechanism may be either electrical or mechanical and in the case of the latter may consist of a ratchet device provided in the shuttle box and operated by the shuttle as it enters the box. Preferably each shuttle box is provided with a spring which is compressed by the shuttle as it enters the box and serves to cushion the shock. Alternatively if single phase working is used, polyphase working may be employed adjacent to the shuttle boxes to provide a decelerating effect should the inertia of the shuttle have to be greater than that required to operate the other moving parts.

One embodiment of a loom in accordance with the invention is shown in FIGS. 3, 4 and 5. Referring to FIGS. 3 and 4, these show the simplest embodiment of the invention in a somewhat diagrammatic manner. The moving member or shuttle shown comprises a flat, thin portion 20 of non-ferrous material and a projecting portion 21 of non-magnetic material shaped to carry the weft package 22, the thread passing through an eyelet (not shown) in the projecting portion. The portion 20 of the shuttle is located during its movement between the top and bottom stator tracks 23 and 24 respectively. The formation of the shed and the beating of the cloth are effected by a plurality of cam surfaces fixedly mounted on a rotatable shaft and over the periphery of which the warp threads pass. The cam surfaces are shown as comprising discs such as 25 provided with aligned radial arms 26, 27 and 28, the arms 26, 27 being on one disc and the arms 28, 29 being on the adjacent disc. The discs are all fixedly mounted on the shaft 30 and it will be understood that a number of discs equal to the number of warp threads required will be mounted on the shaft 30 as indicated in FIG. 5. The peripheries of the arms and the discs are grooved as shown at 31 in FIG. 5 for the reception of the threads and as will be seen in FIG. 3, a shed is formed by one thread e.g. 31, being lifted by the arm 26 while the adjacent thread e.g. 32, passes over the disc. The thread 32 is shown as a dotted line in order to enable the formation of the cloth to be more readily appreciated. With the cam surfaces in the position shown in FIG. 3, the shuttle passes through the shed as shown. Between picks, the cam surfaces rotate through 90 degrees, the weft threads resulting from earlier picks being shown at 33 and 34 in FIGS. 3 and 4. In addition in FIG. 4 the weft thread 35 resulting from the pick just described is shown after the cam surfaces have made a rotation of 45 degrees. It will be seen that when the cam surfaces have completed their rotation of 90 degrees, the thread 32 will be in the raised position since it will pass over the tip of the arm 29 while the thread 31 will pass over the disc 25 and will form the base of the shed. The shedding operation just described is appropriate to a plain weave but it will be understood that by suitable arrangements of the cam surfaces, other weaves may be woven.

It will be seen from FIG. 4 that as the arm 28 rotates during the next 45 degree movement it will slide the weft thread 34 over the edge of the wall 36 and this action will take place as each of the arms passes the wall 36. The weft threads 34, 33 and 35 will thus pass in succession down the wall 36 and by suitably adjusting the speed of rotation of the roller 37, the desired closeness of the weave may be obtained. It will, of course, be understood that the speed of rotation of the shaft 30 on which the cam surfaces are mounted will be considerably greater than that of the shaft on which the roller 37 is mounted.

In order to maintain the tension in the warp threads substantially constant, it is proposed to provide a second set of cam devices similar to the devices 25, corresponding discs in the two sets of devices being out of phase by 90 degrees. The warp threads pass over corresponding cam devices in both sets and due to the phase relation, the path length of the warp threads is maintained substantially constant.

It will be seen from the preceding description that the moving parts in the loom consist of the shuttle, the two sets of cam devices and the take-up roller 37. As previously mentioned it is proposed to employ the energy in the shuttle for driving these three components and two alternative arrangements are shown in FIGS. 7 and 8.

FIG. 7 shows one arrangement for converting the energy of the shuttle into energy for driving the loom and is mechanical in operation. The two stator members are again shown at 50 and 51 and the moving member at 57. In the shuttle box 60 is mounted a ratchet device which consists of an L-shaped member 61 mounted for longitudinal movement in the shuttle box 60. The lower surface of member 61 carries a set of teeth 63 which project through a slot in the base of the shuttle box and engage with a ratchet wheel 64 freely mounted on the spindle 65 to which it is connected by means of a suitable one-way clutch (not shown). In operation, the moving member on entering the shuttle box at the end of a pick will move the member 61 to the right, thereby compressing the spring and rotating the ratchet wheel 64. The member 61 returns to the position shown under pressure from the spring 62 on the next pick. The intermittent rotary movement of the spindle 65 may be used to drive the loom.

An alternative arrangement is shown in FIG. 8 where the upper and lower stator members and the moving member are again indicated by 50, 51 and 57. In this case a permanent magnet 70 is mounted on a shaft 71 movable in a bearing 72 in the rear wall of the shuttle box 73, a spring 74 being mounted between the magnet and the rear wall. As the moving member 57 enters the field of the permanent magnet, a force is exerted on the magnet due to the interaction between the permanent magnet field and the field due to the eddy currents induced in the non-ferrous portion of the shuttle. This force tends to move the permanent magnet and the shaft 70 to the right and the movement of the shaft may be translated into intermittent and unidirectional movement of the spindle 77 through teeth 75 on the shaft 70 which engage with the toothed wheel 76 freely mounted on the spindle 77 and connected thereto by a one-way clutch. The spring 74 serves to assist the return of the shaft to its initial position on the next pick.

It will be understood that the invention is not limited to the precise construction shown in the drawings. For instance, the cam surfaces need not be discs with aligned radial arms but could be in the shape of a rhombus and other modifications will occur to those skilled in the art.

I claim:

An induction machine comprising a stator consisting of first and second stator members fixedly arranged in spaced parallel relation to form a gap therebetween, transverse slots in each of said stator members, two longitudinal slots in at least one of said stator members, first and second sets of coils accommodated in said transverse slots in each of said stator members and continuously energized by polyphase currents, said first sets of coils when energized by polyphase currents generating a magnetic field which moves from one end of said stator to the center of said stator and said second sets of coils when energized by polyphase currents generating a magnetic field which moves from the other end of said stator to the center of said stator, a moving member formed of a thin slab of non-ferrous conducting material arranged to move within the gap between said first and second stator members and being transversely centered due to the change in flux density caused by said longitudinal slots, said moving member having a width substantially equal to the distance between the outer edges of said longitudinal slots, said moving member having characteristics so that if R is the equivalent resistance and X is the equivalent reactance of each phase of said moving member, then $$\frac{R}{X}$$

is less than unity whereby said moving member performs a reciprocatory movement of constant amplitude.

References Cited in the file of this patent

UNITED STATES PATENTS

| 510,431 | Lombard | Dec. 12, 1893 |
|---|---|---|
| 513,615 | Lombard | Jan. 30, 1894 |
| 514,087 | Lombard | Feb. 6, 1894 |
| 514,088 | Lombard | Feb. 6, 1894 |
| 1,020,942 | Bachelet | Mar. 19, 1912 |
| 1,302,437 | Routledge | Apr. 29, 1919 |
| 1,754,685 | Kanter | Apr. 15, 1930 |
| 1,881,014 | Ayers | Oct. 4, 1932 |
| 1,896,418 | Phelps | Feb. 7, 1933 |
| 1,929,990 | Rose | Oct. 10, 1933 |
| 1,950,611 | Hedley et al. | Mar. 13, 1934 |
| 1,950,627 | Parvin | Mar. 13, 1934 |
| 2,074,134 | Taylor | Mar. 16, 1937 |
| 2,112,264 | Bowles et al. | Mar. 29, 1938 |
| 2,135,373 | Wilson | Nov. 1, 1938 |
| 2,203,568 | Grondahl | June 4, 1940 |
| 2,428,570 | Jones | Oct. 7, 1947 |
| 2,630,839 | Birtwell | Mar. 10, 1953 |

FOREIGN PATENTS

| 374,741 | Great Britain | June 16, 1932 |
|---|---|---|
| 483,816 | Great Britain | Apr. 25, 1938 |